United States Patent
Richter et al.

(10) Patent No.: US 10,039,295 B2
(45) Date of Patent: Aug. 7, 2018

(54) METHOD AND DEVICE FOR HEATING A LIQUID PRODUCT

(75) Inventors: Volker Richter, Baernau (DE); Torsten Runge, Straubing (DE); Henri Fischer, Gaden (DE)

(73) Assignee: KRONES AG, Neutraubling (DE)

( * ) Notice: Subject to any disclaimer, the term of this patent is extended or adjusted under 35 U.S.C. 154(b) by 448 days.

(21) Appl. No.: 13/604,873

(22) Filed: Sep. 6, 2012

(65) Prior Publication Data
US 2013/0059055 A1    Mar. 7, 2013

(30) Foreign Application Priority Data

Sep. 7, 2011    (DE) .................. 10 2011 082 286

(51) Int. Cl.
| | |
|---|---|
| *A23L 3/16* | (2006.01) |
| *A23C 3/033* | (2006.01) |
| *A23L 2/46* | (2006.01) |
| *B67C 3/22* | (2006.01) |

(52) U.S. Cl.
CPC ............. *A23C 3/033* (2013.01); *A23L 2/46* (2013.01); *B67C 2003/226* (2013.01)

(58) Field of Classification Search
CPC . A23L 3/003; A23L 3/00; B65B 55/14; B65B 55/18; A61L 2/04; A61L 2/07; A61L 2/0023; A23C 3/033; A23C 3/037; A23C 19/0973; B67C 2003/226
USPC ....... 426/665, 392, 399, 401, 407, 412, 506, 426/521
See application file for complete search history.

(56) References Cited

U.S. PATENT DOCUMENTS

| | | |
|---|---|---|
| 3,622,357 A | 11/1971 | Tillman |
| 4,263,254 A | 4/1981 | Huling |
| 4,416,194 A | 11/1983 | Kemp |
| 4,441,406 A | 4/1984 | Becker et al. |
| 4,490,401 A * | 12/1984 | Becker .................... A23L 3/003 426/407 |
| 4,849,235 A | 7/1989 | Braymand |
| 5,503,064 A | 4/1996 | Scheel et al. |
| 6,214,400 B1 | 4/2001 | Zittel et al. |
| 7,513,092 B2 | 4/2009 | Muenzer et al. |
| 8,356,643 B2 | 1/2013 | Schulz et al. |

(Continued)

FOREIGN PATENT DOCUMENTS

| | | |
|---|---|---|
| AT | 1418 U1 | 5/1997 |
| DE | 29710507 U1 | 8/1997 |
| DE | 10351689 A1 | 6/2005 |

(Continued)

OTHER PUBLICATIONS

German Patent Office, Search Report in German Patent Application No. 10 2011 082 286 (dated Jun. 26, 2012).

*Primary Examiner* — Erik Kashnikow
*Assistant Examiner* — Lela S. Williams
(74) *Attorney, Agent, or Firm* — Leydig, Voit & Mayer, Ltd.

(57) ABSTRACT

A method of flash pasteurizing a liquid product before the product is filled includes preheating the product for flash pasteurization, correction cooling the flash pasteurized product, and intermediately storing cooling water heated in the correction cooling of the flash pasteurized product. Waste heat obtained during at least one of a cooling of filled-in product or a recooling of not filled-in product is supplied to the intermediately stored cooling water.

11 Claims, 2 Drawing Sheets

(56) References Cited

U.S. PATENT DOCUMENTS

2011/0097469 A1    4/2011   Cluesserath

FOREIGN PATENT DOCUMENTS

EP            2184257  A1    5/2010
WO     WO 2010000410  A1    1/2010

* cited by examiner

METHOD AND DEVICE FOR HEATING A LIQUID PRODUCT

CROSS REFERENCE TO RELATED APPLICATIONS

This application claims priority to German Patent Application No. DE 10 2011 082 286.0, filed Sep. 7, 2011, which is hereby incorporated by reference herein in its entirety.

FIELD

The invention relates to a method and a device for heating a liquid product before it is filled.

BACKGROUND

Liquid products, for example juices and the like, are usually preserved by heat treatment and preferably filled into containers in a hot state. Heat treatment is, for example, pasteurization in a flash pasteurizer. Such plants usually comprise a heater for performing heat treatment and a preheating unit for preheating the product to a suited inlet temperature before heat treatment, and a correction cooler for cooling the product temperature to a suited filling temperature after heat treatment.

To this end, it is known, for example from DE 29710507 U1, to recover waste heat from product cooling and use it for heating the following product.

From DE 10351689 A1, it is furthermore known for heating already filled-in product to collect heating and cooling water from individual stages of a bottle cooling tunnel and to return them to individual stages of the bottle cooling tunnel corresponding to the respective temperature of the water employed for spraying the bottles in order to thus employ thermal energy as efficiently as possible.

In flash pasteurizers, strongly varying quantities of the corresponding heat can arise in the individual plant sections depending on the operating state of the heat treatment plant, for example during starting, shutting down, interruptions of the filling process, and the like.

For a careful heat treatment of the product, it is in particular desirable that the treatment temperatures in the individual treatment stages are as uniform as possible and that the product can be treated at an overpressure that is as low as possible. However, this object can only insufficiently be achieved in the known treatment plants with heat recovery.

Therefore, there is a demand for methods for the regenerative flash pasteurization of flowing products and for correspondingly optimized treatment plants that are improved in this respect.

SUMMARY

In an embodiment, the present invention provides a method of flash pasteurizing a liquid product before the product is filled includes preheating the product for flash pasteurization, correction cooling the flash pasteurized product, and intermediately storing cooling water heated in the correction cooling of the flash pasteurized product. Waste heat obtained during at least one of a cooling of filled-in product or a recooling of not filled-in product is supplied to the intermediately stored cooling water.

BRIEF DESCRIPTION OF THE DRAWINGS

Exemplary embodiments of the present invention are described in more detail below with reference to the drawings, in which.

DETAILED DESCRIPTION

Figure 1:
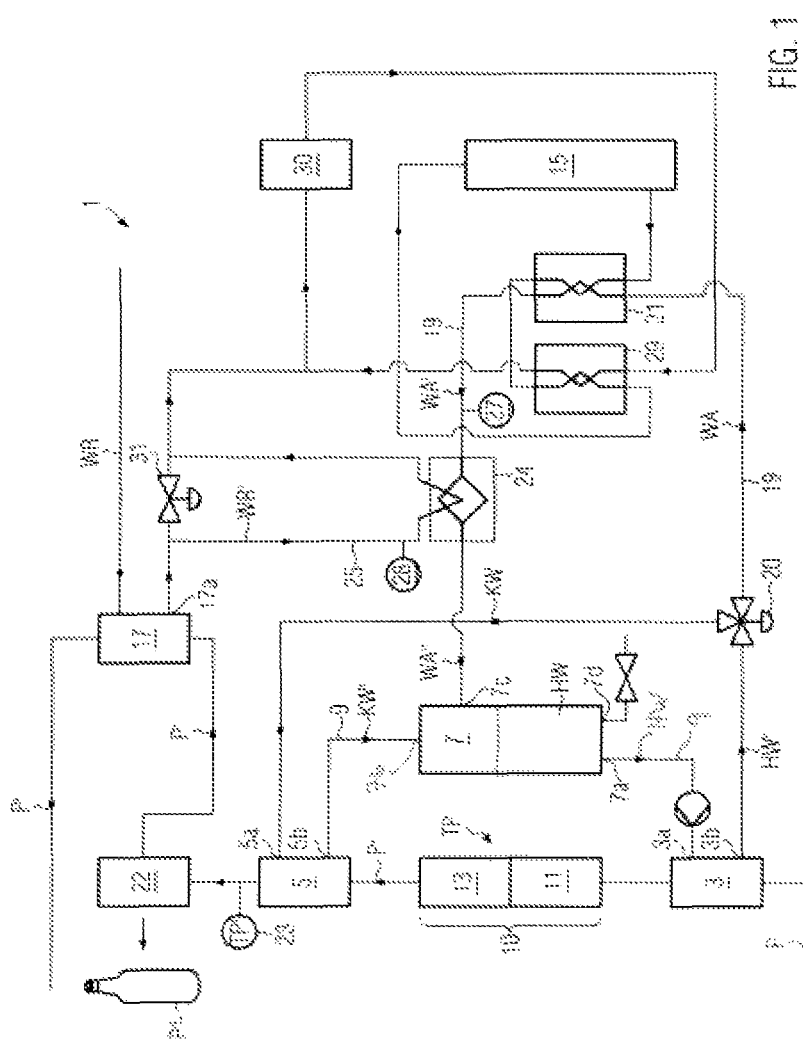
FIG. 1 shows a schematic pipeline and instrument flow chart of an embodiment.

In an embodiment, the present invention provides a method including: a) preheating the product for flash pasteurization; b) correction cooling the flash pasteurized product, in particular for subsequently hot-filling the same; and c) intermediate storage of cooling water heated in step b) to be used as heating water for step a), wherein waste heat obtained during the cooling of filled-in product and/or recooling of not filled-in product is supplied to the intermediately stored cooling water.

By intermediate storage, thermal energy obtained during the cooling of the treated product can also be employed for preheating the product in varying operating states, in particular during starting or shutting down the treatment plant. By supplying waste heat arising in different sections of the heat treatment plant to the intermediately stored cooling water, waste heat arising in different operating states can be collected and averaged over time. The method according to the invention is therefore particularly suited for the gentle flash pasteurization of different liquid products, for example for the pasteurization of beverages. Moreover, the recovered quantity of heat altogether available for preheating the product can be increased and thus energy consumption be optimized.

Preferably, the waste heat is supplied in the form of heat transfer water for intermediately storing the latter together with the heated cooling water as heating water. This type of heat recovery and intermediate storage can be particularly easily realized because in intermediate storage, two water cycles can be joined. Recovered quantities of waste heat could, however, also be transmitted between the hot water and the heat transfer water via heat exchangers.

In a particularly advantageous embodiment, heat from cooling water heated during recooling is transferred to the heat transfer water. The cooling water is thus warmer than the heat transfer water. By this, the waste heat available for heating the heating water can be further increased.

Preferably, the temperatures of the cooling water running back from recooling and of the heat transfer water are measured. Thereby, the temperatures can be compared and it can be determined whether a suited temperature transfer is possible.

Preferably, heat transfer is only admitted if the cooling water flowing back from recooling is warmer than the heat transfer water by at least 2° C., in particular at least 5° C. This temperature difference permits particularly efficient heat recovery and in particular prevents an undesired cooling of the heat transfer water. A temperature difference of at least 8° C. is particularly effective.

Basically, an operation according to an embodiment of the invention of the described system is possible as soon as the cooling water is warmer than the heat transfer water.

In a particularly advantageous variant, heating water flowing back from preheating in step a) is furthermore used for correction cooling. The heating water then has a temperature suited for cooling, so that a separate cooling circuit for correction cooling becomes dispensable.

Preferably, the product temperature corrected in step b) is measured, and a first part of the heating water flowing back from preheating is used as cooling water in step b) in response to the measured product temperature. This is in particular advantageous since the required refrigerating capacity in the correction cooling unit and the required heating power in the preheating unit are approximately constant during heat treatment. Thus, a simple and stable control loop can be provided.

A remaining part of the heating water flowing back from preheating is preferably used as heat transfer water for supplying the waste heat in step c). By this, a heat transfer cycle can be easily realized.

In an embodiment, the present invention also provides a device for flash pasteurizing a liquid product. Accordingly, the latter comprises: a preheating unit for preheating the product for heating; a correction cooling unit for cooling the flash pasteurized product, in particular for subsequently hot filling the product; a buffer tank for intermediately storing cooling water heated in the correction cooling unit; a hot water cycle for connecting an outlet of the buffer tank to the flow line of the preheating unit; and a heat transfer cycle for supplying waste heat from a container cooling unit and/or a return cooling unit into the buffer tank.

By means of the buffer tank, thermal energy obtained during the cooling of the treated product can be uniformly fed into the preheating unit even in varying operating states, in particular during starting or shutting down the treatment plant. Moreover, one can supply heated water to the buffer tank in different sections of the heat treatment plant. By this, quantities of heat arising in different operating states can be collected and averaged over time. The device according to the invention is therefore particularly suited for gentle flash pasteurization of different liquid products at reduced overpressure, for example for the pasteurization of beverages.

With the heat transfer cycle, the returned quantity of heat that can be used for preheating the product can be increased. The quantities of heat arising in the container cooling unit, for example a cooling tunnel, that vary depending on the operating state can be intermediately stored in the buffer tank, so that for preheating, a quantity of heat is available that is largely constant over time.

A particularly advantageous embodiment further comprises a control device in the return line of the preheating unit to connect the latter partially with the correction cooling unit and the heat transfer cycle. By means of the control device, the cooling stream upstream of the correction cooling unit can be adjusted to obtain a constant product temperature downstream of the correction cooling unit. An additional proportion of the water flowing back from the preheating unit can be supplied to the container cooling unit. Such a control loop can be in particular realized in a simple manner because the quantity of waste heat arising at the correction cooling unit during the treatment of a product batch is largely constant over time. Equally, the quantity of heat required for preheating the product is approximately constant largely independent of the operating state of the treatment plant.

Preferably, a heat transfer line is furthermore provided to transfer waste heat from the return line of a recooling unit to the heat transfer cycle, in particular by means of a heat exchanger.

By this, the returnable quantity of heat can be additionally increased. Thus, heat can be recovered in particular in an operating state in which the product is not being filled. This is advantageous in particular in combination with heat recovery from a container cooling plant as then both in an operating state where the product is being filled and in an operating state where no product is being filled, waste heat is available for recovery for preheating. Thus, waste heat can be particularly uniformly fed into the buffer tank.

With a heat exchanger, the heat from the heat transfer line can also be supplied in a case where the heat transfer line itself cannot be part of the hot water cycle or heat transfer cycle, for example for hygienic reasons. The heat exchanger could, as an alternative, also be provided at the buffer tank to supply heat from the heat transfer line directly into the latter.

Preferably, the flow through the heat transfer line is controllable, in particular depending on a temperature difference to the heat transfer cycle. A controlling device in the return line of the recooling unit here permits a metered supply of the heat, depending on the availability of waste heat and on the demand. To this end, a comparison device can be provided for comparing the water temperature in the heat transfer line and in the heat transfer cycle. This can ensure that heat transfer only takes place if the water temperature in the heat transfer line is higher than the water temperature of the heat transfer cycle by a predetermined degree. One can in particular thereby prevent that the water in the heat transfer cycle is cooled by the heat transfer line.

A particularly advantageous embodiment comprises a recooling unit having at least two stages on the water side to supply waste heat from the hottest, in particular exclusively the hottest stage of the recooling unit to the buffer tank. By this, a desired, advantageously high temperature level can be provided in the heat transfer line. By this, a water temperature can be in particular achieved in the heat transfer line that is higher than the water temperature in the heat transfer cycle.

In a further advantageous embodiment of the device according to the invention, furthermore at least one further heat transfer line is provided to supply waste heat from a unit for cleaning containers and/or a brewhouse to the buffer tank. By this, the proportion of returned waste heat for preheating the product can be further increased. By connecting further sources of heat, moreover an even more uniform heat supply into the buffer tank can be realized. For this, suited control devices for controlling the heat flow can be provided in the respective heat transfer lines.

Preferably, a cleaning port, for example a waste water drain, is provided at the buffer tank. By this, the buffer tank, and with the latter the connected hot water cycle, can be easily cleaned.

As can be seen in FIG. 1, a preferred embodiment 1 of the device according to the invention for flash pasteurizing a liquid product P, such as a beverage, comprises a preheating unit 3 for preheating the product P for directly subsequent flash pasteurization, a correction cooling unit 5 for adjusting a product temperature TP' of the previously flash pasteurized product P', in particular for the subsequent hot filling of the treated product P', and a buffer tank 7 for intermediately storing hot water HW for the preheating unit 3.

Furthermore, a hot water cycle 9 is provided in which the heating water HW is transported from an outlet 7a of the buffer tank 7 to the flow line 3a of the preheating unit 3. A first proportion of the cooled heating water HW' flowing back from the return line 3b of the preheating unit 3 is guided as cooling water KW to the flow line 5a of the correction cooling unit 5. The cooling water KW' heated during correction cooling flows out of the return line 5b of the correction cooling unit 5 to a first inlet 7b of the buffer tank 7 to be intermediately stored there as a first proportion of the heating water HW.

Between the preheating unit 3 and the correction cooling unit 5, a treatment unit 10 for flash pasteurization, for example pasteurization, of the product P is provided on the product side in a well-known manner, for example comprising a heater 11 and a heat retention unit 13. The preheating unit 3, the heater 11, and the correction cooling unit 5 are embodied, for example, by heat exchangers of a well-known design. The heat retention unit 13 comprises, for example, a pipe section or a pipe system of a well-known design.

The heating water HW flowing in from the buffer tank 7 is additionally heated by a (non-depicted) heat exchanger, as required, for example by means of vapor. The heater 11 can also be heated by vapor in a well-known manner (not represented).

The heating water HW and thus the preheating unit 3 are, as available, heated by waste heat recovered from the correction cooling unit 5 and preferably also by waste heat of additional cooling units. These can comprise, as shown by way of example in FIG. 1, a container cooling unit 15 for cooling the filled product P" as well as a recooling unit 17 for cooling flash pasteurized, but not yet filled-in product P' to be returned to a medium distribution unit, or the like.

For heat recovery from the container cooling unit 15, a heat transfer cycle 19 is provided which branches off from the heating water cycle 9 at a controlling device 20, for example an adjustable flap, for splitting up the heating water HW' cooled in the preheating unit 3. From there, the heat transfer cycle 19 guides a second proportion of the returning heating water HW' as heat transfer water WA to a heat exchanger 21 in the region of the container cooling unit 15 and further to a second inlet 7c of the buffer tank 7. With the aid of the heat exchanger 21, thus waste heat obtained during the cooling of filled containers can thus be transferred to the heat transfer cycle 19, and the heat transfer water WA' heated in this manner can be subsequently intermediately stored in the buffer tank 7.

While the waste heat available at the container cooling unit 15 depends on the operating state of an only schematically indicated filling unit 22 for filling the product P' into containers, at the correction cooling unit 5, a quantity of waste heat essentially constant over time is available in the running operation and can be continuously supplied to the buffer tank 7 with the heated cooling water KW'. Thus, with the aid of the buffer tank 7, waste heat can be collected from different cooling units and averaged over time to provide a suited returned heat flow in the flow line 3a of the preheating unit 3 even in case of irregular or varying operating states of individual treatment units.

Depending on the product temperature TP' measured behind the correction cooling unit 5 by means of a temperature measurement device 23, the control device 20 provides a first part of water HW' flowing back from the preheating unit 3 as cooling water KW for the correction cooling unit 5. The remaining part of water HW' flowing back from the preheating unit 3 that is not employed for correction cooling is supplied to the heat transfer cycle 19 as heat transfer water WA. Thus, the quantities of heat required for preheating and the quantities of heat to be removed during correction cooling can be exactly adapted to a continuous flow of the product P to be treated including the buffer tank 7, and simultaneously, excessive and/or changing quantities of heat can be recovered from heat-treated product and utilized at a suited time for the heat treatment of following product. By the intermediate storage in the buffer tank 7, particularly uniform and flash pasteurization that is gentle to the product is permitted at low energy consumption and low overpressure.

As FIG. 1 furthermore shows, a further heat exchanger 24 is preferably provided in the heat transfer cycle 19 to additionally heat the heat transfer water WA' heated in the region of the container cooling unit 15 and flowing back towards the buffer tank 7. One then obtains correspondingly hotter heat transfer water WA" at the inlet 7c of the buffer tank 7. Waste heat available for this purpose is supplied to the heat exchanger 24 from at least one further product cooling unit, such as for example the recooling unit 17. For this, a heat transfer line 25 is provided which in the shown example connects a return line 17a of the recooling unit 17 to the heat exchanger 24.

In the heat transfer cycle 19 and the heat transfer line 25, temperature measuring devices 27, 28 are each provided in front of the heat exchanger 24 to measure and compare the water temperature in the heat transfer cycle 19 and in the heat transfer line 25. This ensures that heat transfer only takes place in the heat exchanger 24 if the water temperature in the heat transfer line 25 is higher than the temperature in the heat transfer cycle 19 by a predetermined amount. A suited temperature difference is, for example, at least 5° C. or in particular at least 10° C.

In other words, heat transfer only takes place in the heat exchanger 24 if a suited quantity of waste heat is available at the recooling unit 17. In contrast to the correction cooling unit 5, the waste heat at the recooling unit 17 arises discontinuously in running operation. However, here, too, the intermediate storage in the buffer tank 7 permits an efficient utilization of the only temporarily arising waste heat from the recooling unit 17. Thus, the buffer tank 7 generally permits the combination of continuously arising quantities of waste heat, for example from the correction cooling unit 5, with possibly irregularly arising quantities of waste heat, for example from heated cooling water WR' of the recooling unit 17 and/or the container cooling unit 15.

For the sake of good order, in FIG. 1, a heat exchanger 29 with corresponding cooling tower 30 is moreover indicated in the region of the container cooling unit 15.

Equally, a cleaning port 7d of the buffer tank 7 is indicated through which cleaning of the buffer tank 7 and the connected water cycles is permitted.

Figure 2:
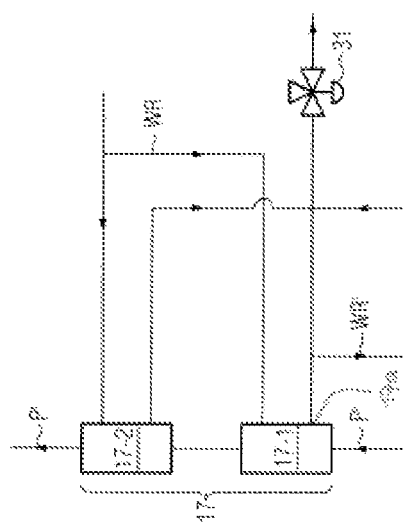
FIG. 2 shows a detail of the flow chart of FIG. 1 in a variant with a two-stage recooling unit.

As FIG. 2 illustrates, the recooling unit 17 is preferably designed at least with two stages to connect the heat transfer line 25 with the first stage 17-1 at the inlet side and thus ensure an advantageously high temperature level in it. By this, an advantageously effective heat transfer from the recooling unit 17 at the heat transfer cycle 19 and into the buffer tank 7 is to be permitted. In FIG. 2, only a second cooling stage 17-2 is indicated. However, for the method according to the invention, the number of subsequent cooling stages is not essential insofar as only a suited temperature level in the return line 17a of the first stage 17-1 must be provided.

In the return line 17a of the recooling unit 17, a further controlling device 31 is preferably provided to guide suitably heated cooling water WR' to the heat exchanger 24 when waste heat is available in the recooling unit 17. As an alternative, the controlling device 31 guides cooling water WR' flowing back from the recooling unit 17 to the cooling tower 30. In the preferred embodiment of the recooling unit 17 represented in FIG. 2, it is decisive that the cooling water WR is brought to an advantageously high temperature level thus suited for heating in the heat transfer cycle 19 and is available as additional source of heat for preheating the product P buffered by means of the buffer tank 7.

One can work as follows with the device according to the invention:

The product P to be thermally treated and filled is continuously supplied to the preheating unit 3 and by the latter brought to a suited temperature for subsequent flash pasteurization. The preheated product is heated to the desired treatment temperature TP in the heater 11 and maintained on the desired treatment temperature TP for a predetermined treatment time in the subsequent heat retention unit 13. The treatment duration is here essentially determined by the flow rate of the product P and the length of the pipe section of the heat retention unit 13 through which the product flows. Flash pasteurization can thus be done with the aid of the heater 11 and the heat retention unit 13 in a well-known manner. The product P' treated in this way is supplied to the correction cooling unit 5. In the latter, the product is cooled to the desired filling temperature TP'.

Here, preheating, heating, heat retention and cooling to the filling temperature TP' is effected in a continuous product flow, so that the quantities of heat for preheating, heating and the quantity of waste heat in correction cooling are essentially constant in running operation. Control is accomplished here essentially depending on the product temperature TP' before filling measured after correction cooling. This means that the quantities of heat each exchanged during the heat transfer for heating and cooling are adjusted depending on the treatment temperature TP, the treatment duration and the filling temperature TP'. By means of the controlling device 20, the heat transfer in the hot water cycle 9 is stabilized for a continuous product flow, and to this end, not required returning cooling water HW' is fed into the heat transfer cycle 19.

Depending on the operating state, different quantities of waste heat can arise in the container cooling unit 15. For example, during the starting of the flash pasteurizer, no filled containers are yet cooled, so that in the container cooling unit 15, initially no waste heat can be made available to be introduced into the hot water cycle 9. Equally, during shutting down the treatment plant, waste heat can still arise in the container cooling unit 15, while the complete product batch has already been heat treated, so that at this point in time, no preheating in the preheating unit 3 is required any longer. In both cases, the buffer tank 7 permits a compensation over time of the quantity of heat made available in the hot water cycle 9 of the preheating unit 3 over time.

Equally, the product P' can be cooled to a predetermined temperature level and thus recycled during a standstill of the filling unit 22 with the aid of the recooling unit 17. In this case, waste heat arises at the recooling unit 17 which can be, according to the invention, fed into the buffer tank 7 and thus into the hot water cycle 9. Thus, even in case of an only temporary availability of waste heat in the recooling unit 17, waste heat can be recovered and utilized for preheating following product P essentially independent of the operating state.

With the aid of suited heat exchangers and supply lines, further waste heat sources could be connected to the shown hot water cycle 9 by means of the buffer tank 7. One can additionally supply waste heat from other plant regions to the heating water HW and intermediately store it, for example from a brewhouse and/or a cleaning plant for containers. Thus, in particular the buffer tank 7 permits a flexible connection of different waste heat sources to the hot water cycle 9 of the flash pasteurizer 1. Thus, waste heat sources from other production regions can also be included.

It would also be conceivable to provide separate buffer tanks for individual waste heat sources and mix the heating water HW outside the buffer tank 7. Equally, additional heat exchangers could be provided, for example to separate the hot water cycle from heat transfer cycles as long as the heating of the heating water HW for product preheating is possible from different waste heat sources. The shown embodiment, however, can be particularly simply and reliably realized.

While the invention has been particularly shown and described with reference to preferred embodiments thereof, it will be understood by those skilled in the art that various changes in form and details may be made therein without departing from the spirit and scope of the invention.

What is claimed is:

1. A method of flash pasteurizing a liquid product before the product is filled into containers, the method comprising:
   preheating the product to a temperature for flash pasteurization using heating water;
   flash pasteurizing the product;
   correction cooling the flash pasteurized product with cooling water causing the cooling water to be heated;
   intermediately storing the cooling water, which was heated in the correction cooling of the flash pasteurized product, in a buffer tank for use as the heating water in the preheating of the product; and
   supplying waste heat to the intermediately stored cooling water, the waste heat being obtained during at least one of:
   a cooling of the containers with filled-in product; and
   a recooling of the flash pasteurized product,
   wherein the correction cooling of the flash pasteurized product is conducted for subsequent hot filling of the product, and
   wherein the intermediately stored cooling water is at a temperature effective to preheat the product to the temperature for flash pasteurization.

2. The method recited in claim 1, wherein the waste heat is supplied by means of heat transfer water, the heat transfer water and the intermediately stored cooling water being intermediately stored together and being provided as the heating water for the preheating the product.

3. The method recited in claim 2, further comprising transferring heat from recooling heated cooling water to the heat transfer water.

4. The method recited in claim 3, further comprising measuring a temperature of the cooling water flowing back from recooling and of the heat transfer water.

5. The method recited in claim 4, wherein heat transfer to the heat transfer water is only permitted if the cooling water flowing back from the recooling is warmer than the heat transfer water by at least 2° C.

6. The method recited in claim 4, wherein heat transfer to the heat transfer water is only permitted if the cooling water flowing back from the recooling is warmer than the heat transfer water by at least 5° C.

7. The method recited in claim 1, wherein the heating water used for the preheating the product for flash pasteurization is subsequently provided as the cooling water for the correction cooling.

8. The method recited in claim 7, further comprising measuring a product temperature corrected in correction cooling of the flash pasteurized product, and using a first portion of the heating water flowing back from the preheating in the correction cooling based on the measured product temperature.

9. The method recited in claim 8, wherein the heating water flowing back from the preheating consists of the first portion and a remaining portion, the method further comprising using the remaining portion of the heating water flowing back from the preheating as a heat transfer water in the supplying waste heat to the intermediately stored cooling water.

10. The method recited in claim 1, wherein the intermediately stored cooling water does not undergo any additional heating before being used as the heating water in the preheating of the product.

11. The method recited in claim 1, wherein the flash pasteurizing is performed in a treatment unit and the preheating is performed in a preheating unit disposed upstream from the treatment unit.

* * * * *